July 4, 1950     O. SCHLÄPFER     2,513,588
APPARATUS FOR WEAKENING THE FIELD IN
TRACTION MOTORS FOR VEHICLES
Filed June 7, 1947
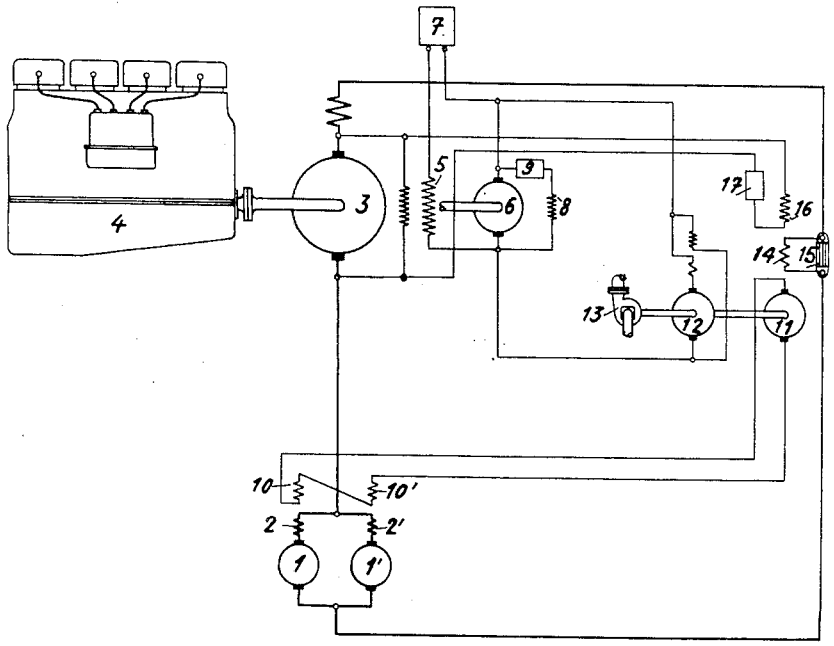
INVENTOR:
OSCAR SCHLÄPFER
BY K. A. Mayr
ATTORNEY Patented July 4, 1950

2,513,588

UNITED STATES PATENT OFFICE 2,513,588

APPARATUS FOR WEAKENING THE FIELD IN TRACTION MOTORS FOR VEHICLES

Oscar Schläpfer, Winterthur, Switzerland, assignor to Sulzer Freres, Societe Anonyme Application June 7, 1947, Serial No. 753,268
In Switzerland June 12, 1946

2 Claims. (Cl. 318—154)

The invention relates to apparatus for controlling the field of traction motors for vehicles which motors are connected to a main generator driven by an internal combustion engine whose speed may vary under varying load conditions. The traction motors are provided with main and auxiliary field windings, the former windings receiving current from the main generator, and the latter windings being fed from an exciter machine. This machine has a field winding influenced by the main generator current and a field winding influenced by the main generator voltage and is connected to the traction motor auxiliary field windings in such a way that when the main generator current is high, the traction motor auxiliary field windings support the main field windings to strengthen the field and when the generator voltage is high, the auxiliary windings oppose the main field windings and weaken the field. The exciter machine is connected to an auxiliary motor which runs at a speed which is independent of the speed of the internal combustion engine. Preferably the auxiliary motor has a speed which is at least approximately constant.

In conventional arrangements the exciter machine for the traction motor auxiliary field windings is mounted on the same shafting as the main generator and driven directly by the internal combustion engine, or it is coupled to the engine in some other manner. In such arrangements the exciter machine is subjected to the fluctuations in speed of the internal combustion engine. If the internal combustion engine and consequently also the exciter machine run at a low speed the weakening of the traction motor field is insufficient at a high main generator voltage. In the same way, with a high main generator current the desired strengthening of the traction motor field at a low speed is not obtained. Furthermore, since the internal combustion engine is normally driven at a comparatively low speed, the exciter machine must be made large and heavy. These disadvantages are eliminated or reduced according to the present invention by the exciter machine being connected to one of the auxiliary machines which are always provided in the vehicle. These machines as a rule run at substantially higher speed than the internal combustion engine, and their speeds can usually be kept at least approximately constant. Because of this factor the strengthening or weakening of the traction motor field due to the operation of the exciter machine is equally effective at all speeds of rotation of the internal combustion engine. There is also the further advantage that as it runs at a high speed the exciter machine can be of light weight.

Further and other objects of the present invention will be hereinafter set forth in the accompanying specification and claims and shown in the drawing which, by way of illustration, shows what I now consider to be a preferred embodiment of my invention.

The drawing is a schematic wiring diagram of a motive power plant according to the invention.

Referring more particularly to the drawing, the traction motors 1, 1' are provided with main series field windings 2, 2' which are connected to the main generator 3. The latter is driven by a Diesel engine 4 and one of its field windings 5 is separately excited by an auxiliary generator 6. The separate excitation of the main generator field may be regulated by hand or automatically in some known manner, by means of a controller 7 for instance in order to keep the load constant. The auxiliary generator 6 is excited by a shunt winding 8 whereby, for instance, its voltage may be kept constant with the help of a voltage regulator 9.

In addition to the main series field windings 2, 2' the traction motors 1, 1' have auxiliary field windings 10, 10', which are connected to an exciter machine 11. The latter is coupled to a motor 12 provided for driving a cooling-water pump 13 for circulating a coolant for the power plant which pump runs at a constant and high speed. The exciter machine 11 is provided with a first field winding 14 through which flows a part of the current generated in the main generator 3, while the rest of the current from the main generator passes through a shunt resistance 15. The latter could in certain circumstances be omitted, so that the whole main generator current would then pass through the first field winding 14. The exciter machine 11 has also a second field winding 16 which is connected to the terminals of the main generator 3. In the current circuit of this winding a regulating device 17 is fitted for adjusting the excitation. A series resistance may for example be used for this purpose.

The first and second field windings 14 and 16 are connected to oppose one another in such a way that when the main generator current is large the effect of the first winding 14 prevails so that the auxiliary field windings 10, 10' of the traction motors reinforce the main field windings 2, 2'. On the other hand, with a high voltage and low current, the action of the second field winding 16 of the exciter machine prevails, so that the auxiliary field windings 10, 10' oppose the main field windings 2, 2'. The traction motors 1, 1' consequently operate at strengthened field when the travelling speed of the vehicle is low, and on the other hand with weakened field when the speed of the vehicle is high. Thus the output of the Diesel engine 4 can be fully utilized within a wide range of rotational speed, without considerable change of the voltage of the main generator 3. This permits light weight construction of the main generator 3.

Instead of the circulating pump 13 other auxiliary machines for the power plant could of course be connected to the exciter machine 11, for instance a fan. The motor 12 could be connected to a network fed from a battery of accumulators instead of to the auxiliary generator 6 as herein described. As a rule the auxiliary motor will drive some device in addition to the exciter machine, but it would be possible to connect the motor 12 to the exciter machine 11 only. In this case the motor 12 would still be regarded as an auxiliary machine and be independent of the speed of rotation of the internal combustion engine.

While I believe the above described embodiment of my invention to be a preferred embodiment, I wish it to be understood that I do not desire to be limited to the exact details of design and construction shown and described, for obvious modifications will occur to a person skilled in the art.

I claim:

1. A power plant for the propulsion of vehicles, comprising, in combination, a variable speed internal combustion engine, a main electric generator connected to and driven by said engine, an electric traction motor, means electrically connecting said generator and said motor, said motor having main field windings connected in series with said means and auxiliary field windings, an exciter wired to and feeding said auxiliary windings, a source of rotary power connected to and driving said exciter, the speed of said source being independent of the speed of said internal combustion engine, said exciter comprising two individual field windings individually wired to and being individually dependent, one on the current and the other on the voltage of said main generator, said exciter being so connected to said auxiliary field windings as to assist said main field windings at high generator current and to oppose said main field windings at high generator voltage.

2. A motive power plant as defined in claim 1, comprising an auxiliary electric generator electrically connected to said source of rotary power which is an electric motor.

OSCAR SCHLÄPFER.

REFERENCES CITED

The following references are of record in the file of this patent:

UNITED STATES PATENTS

| Number | Name | Date |
|---|---|---|
| 1,493,773 | Dorion | May 13, 1924 |
| 1,698,288 | Winne | Jan. 8, 1929 |
| 1,764,365 | Stoltz | June 17, 1930 |
| 1,891,963 | Lemp | Dec. 27, 1932 |
| 1,992,568 | Connor | Feb. 26, 1935 |
| 2,424,310 | Frisch | July 22, 1947 |